Nov. 24, 1970   H. L. SHATTO, JR   3,541,782
CONTROL FOR RESONANT VIBRATING SYSTEM
Filed Oct. 24, 1968   2 Sheets-Sheet 2
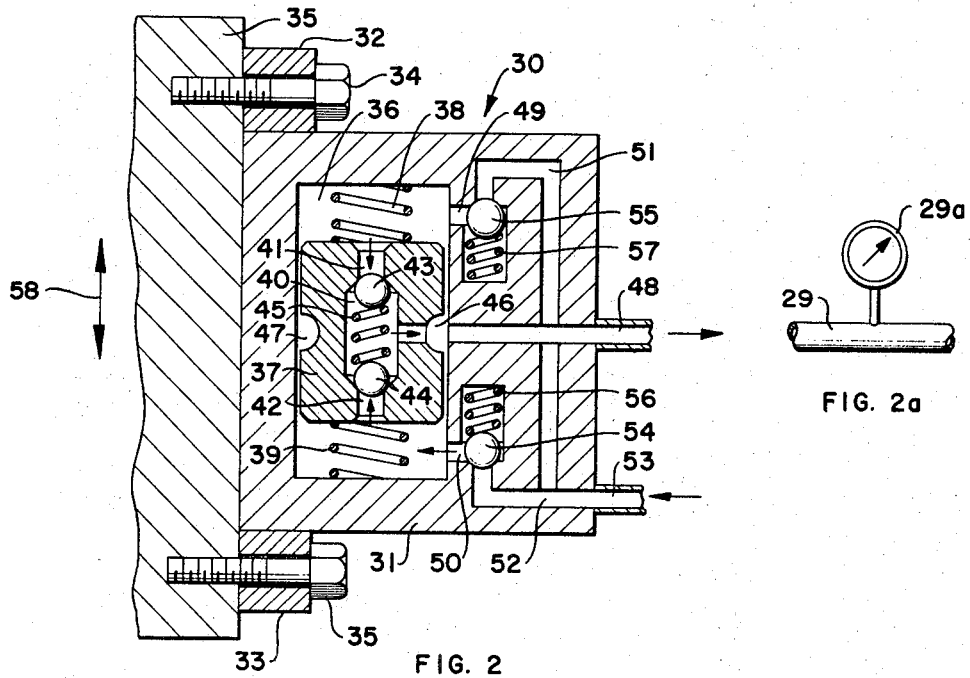
FIG. 2
FIG. 2a
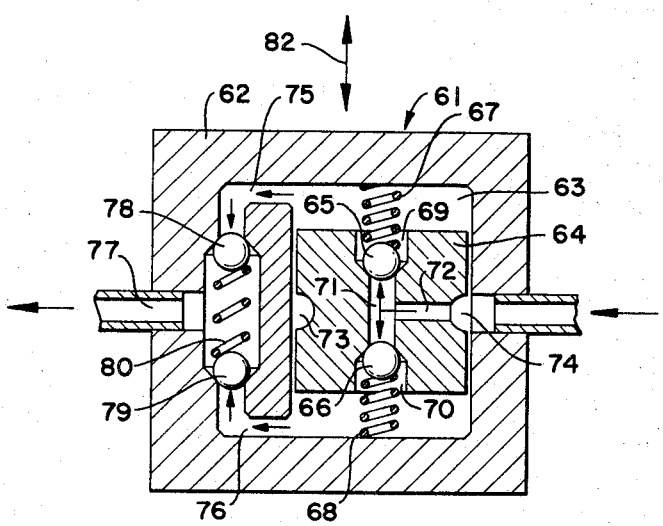
FIG. 3
INVENTOR:
H. L. SHATTO, JR
BY: *Fielding E. Baker*
HIS ATTORNEY

United States Patent Office 3,541,782
Patented Nov. 24, 1970

3,541,782
CONTROL FOR RESONANT VIBRATING SYSTEM
Howard L. Shatto, Jr., La Jolla, Calif., assignor to Shell Oil Company, New York, N.Y., a corporation of Delaware
Filed Oct. 24, 1968, Ser. No. 770,144
Int. Cl. F01c 9/00
U.S. Cl. 60—1                     6 Claims

ABSTRACT OF THE DISCLOSURE

A vibrationally activated transducer is coupled to an output member of a resonant vibration system to provide fluid volume and/or pressure which is related to the frequency and/or amplitude of the output member of the system to provide an indication of acceleration and to operate control means controlling the output of the oscillator of the system.

BACKGROUND OF THE INVENTION

This invention relates to resonant vibratory work-forming systems and pertains more particularly to a control system to prevent the over-running and possible self-destruction of such a resonant system.

Many applications of high powered sonic vibrations have been recently developed. These applications include, for example, drilling, pile driving, mixing of chemicals and fluids, and the enhancement of chemical reaction. The typical resonant system comprises an oscillator and work member coupled to an elastic resonant member sometimes referred to as a resonator. This arrangement provides a system which when operated at its resonance frequency delivers high levels of sonic energy from the oscillator to the work member at maximum efficiency. In such a system inertia is balanced by elasticity and the force or energy needed from the oscillator for each cycle is only that necessary to replace the energy lost or used in order to maintain this system in motion. Under heavy load or damping conditions a large amount of energy must be delivered to the system by the oscillator to meet the needs of the apparatus, that is, the energy taken away or absorbed by the work member.

One major problem with such resonant systems is that the resonance frequency under load conditions and under no load conditions is substantially the same. In other words, when the load is removed from the system or from the work member the system is still in resonance. If this load is suddenly removed, the system generally reacts much like an ungoverned engine except that the speed does not increase much but the displacement amplitude many times increases to such a level that the system may destroy itself. Such systems require constant attention by the operator to adjust the force output of the oscillator to insure that the system does not suddenly over-run and destroy itself.

Apart from the problem of over-running, under conditions of normal operation the system may develop such forces as to exceed the stress limits of the resonator member. This is particularly true when the work load falls considerably below the normal work load of the system for a period of time.

SUMMARY OF THE INVENTION

To overcome the above problems with resonant systems the present control system has been devised which comprises sensing means which is responsive to the acceleration and/or amplitude of vibration of the work member and initiates a signal which is a function of the acceleration and/or amplitude of the work member, which signal is transmitted to control means for controlling the frequency and force output of the oscillator of the system.

It is a primary object of the present invention to provide an automatic control system for a resonance vibratory work performing system which is responsive to decreasing load of the system to prevent over-running or self-destruction of the system.

It is a further object of the present invention to provide automatic control means to adjust a resonant vibratory system to the load imposed thereon.

BRIEF DESCRIPTION OF THE DRAWINGS

The above and other objects and advantages of the present invention will become evident from the following detailed description when read in conjunction with the drawings wherein:

FIG. 2 is a side elevational view in section of an embodiment of an accelerometer for use in the present invention;

FIG. 2A is a schematic illustration of a modification of the present invention; and FIG. 3 is a side elevation in section of a second embodiment of a suitable accelerometer for the present invention.

DETAILED DESCRIPTION OF THE DRAWINGS

Figure 1:
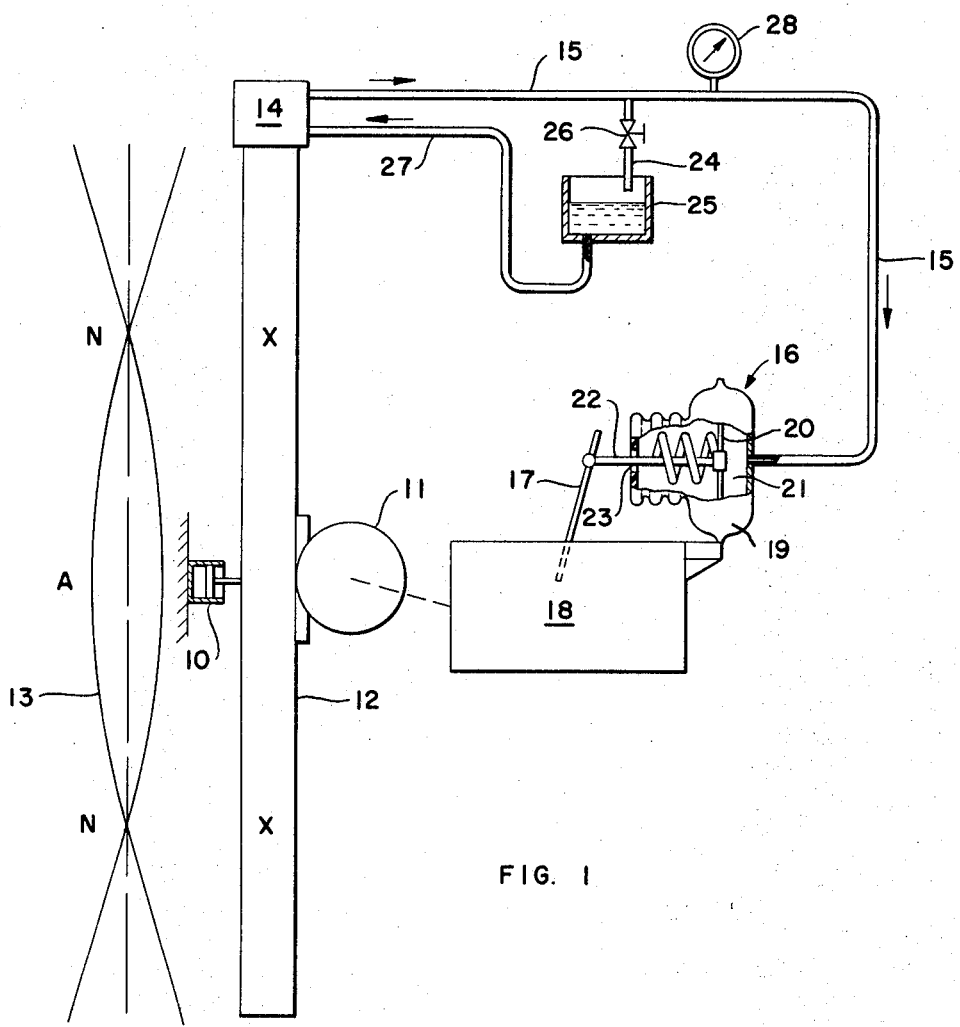
FIG. 1 is a schematic illustration of a resonant vibratory system constructed in accordance with the present invention.

Referring now to the drawings and in particular to FIG. 1 there is illustrated a schematic diagram of a resonant vibratory system in which an oscillator 11 is coupled to an elastic member 12 which may be either coupled to or serve as a work member coupled to a load 10. In a typical system the oscillator may be coupled at any suitable position, preferably at an antinode, to the elastic resonant member. This position would depend upon a geometric configuration of the resonant member. For example, for an elongated rectangular bar the oscillator may be positioned at the center of the bar or at either end. The elastic resonant member may be driven in a suitable standing wave pattern as illustrated by the wave pattern 13. The wave pattern 13 illustrates a typical half wave pattern in a bar, said wave pattern having three antinodes or points of maximum velocity and motion and two nodal areas or points of minimum velocity and motion.

In my system I provide sensing means 14 which may be either a hydraulic accelerometer or velocity transducer, the details of which are illustrated in FIGS. 2 and 3, which is attached in the vicinity of an antinodial point to either the elastic resonant member or the work member. This sensing means is responsive to increased amplitude of acceleration or to velocity of motion to generate a signal which in the case of a hydraulic accelerometer would take the form of a change in fluid pressure or in the case of a velocity transducer to fluid flow. Signal transmission means 15, which in this case would take the form of a suitable conduit member, transmits the signal to oscillator control means which comprises signal responsive means 16. A pressure gauge 28 operatively coupled into conduit means 15 may be calibrated to indicate the acceleration of 14.

In the illustrated embodiment, signal responsive means 16 is responsive to the signal generated by an accelerometer 14 to control the throttle 17 of an engine or prime mover 18 for driving the oscillator 11. Suitable oscillator control means may take the form of pressure responsive means 16 and comprises a housing means 19 in which is mounted a diaphragm 20 to form a pressure chamber 21 into which fluid from the accelerometer 14 is received. The diaphragm 20 is connected such as by means of a rod 22 extending through opening 23 and housing 19 to throttle control member 17. The signal transmission circuit includes second conduit member 24 communicating with conduit member 15 and communicating with hydraulic reservoir 25. An adjustable restriction 26 is positioned in conduit member 24 to restrict the flow of fluid therethrough. A conduit member 27 communicates witr the hydraulic reservoir 25 and an intake port (not shown) on the hydraulic accelerometer 14.

Looking now to FIG. 2 there is shown, in detail, a hydraulic accelerometer 30 comprising a housing member 31 having means such as a pair of lugs 32 and 33 for attachment such as by means of studs 34 and 35 to the active portion of a resonant member or work member 35. The housing 31 is formed with an internal cylindrical bore 36 having a free inertial mass piston 37 reciprocally mounted therein. The piston 37 is preferably biased to substantially the center of the cylinder 36 by means of a pair of springs 38 and 39. The piston 37 is formed with a central bore 40 therein extending substantially along the axis thereof and a pair of ports 41 and 42 formed in either end thereof and communicating between bore 40 and cylindrical bore 36. A pair of valve elements 43 and 44 are positioned in the bore 40 and biased by means of spring means 45 into valve seats formed at the merger of ports 41 and 42 with central bore 40. Conduit means 46 provides communication between central bore 40 and an annular groove 47 which in turn provides communication with a discharge conduit 48. A pair of ports or conduits 49 and 50 provides communication between respective ends of cylindrical bore 36 and intake conduits 51 and 52. These conduits 51 and 52 also communicate with intake or supply conduit 53. The flow of fluid through conduits 51 and 52 is controlled by means of a pair of valves comprising spherical members 54 and 55 which are biased into seating or closed position by means of springs 56 and 57. This apparatus would function as a hydraulic accelerometer when the output flow is restricted and pressure sensing means 28 are provided as illustrated in FIG. 1. However, with unrestricted flowline 29 and flow measuring means 29a as illustrated in FIG. 2A, the apparatus becomes a hydraulic velocity transducer.

When the resonant member or work member 35 is accelerated rapidly to and fro, such as along the direction of double-readed arrow 58, the assembly including cylindrical bore 36 moves substantially along the axis thereof with respect to the free piston 37 thus setting up a pumping action with a flow of fluid through the system as indicated by the arrows. The flow of fluid through the system as well as the pressure of that fluid will be a function of the movement of piston 37 with respect to the housing member 31, which movement will be a function of any change in amplitude of motion as well as amplitude or acceleration of the member 35.

Looking now to FIG. 3 there is shown a second embodiment of an accelerometer 61 in which a housing member 62 is formed with central cylindrical bore 63 in which a free piston 64 is reciprocally mounted. A pair of spherical valve means 65 and 66 are biased by means of springs 67 and 68 into valve seats formed by the juncture or intersection of cylindrical bores 69 and 70 with conduit means 71 in the piston 74. A conduit 72 communicates between conduit 71 and annular groove 73 which in turn communicates with supply conduit 74. Conduits 75 and 76 communicate with either end of cylindrical bore 63 and the discharge conduit or port 75. Spherical check valve means 78 and 79 are biased by means of the spring 80 into valve seats formed by the juncture of conduits 75 and 76 with cylindrical bore 81 in housing 62.

As the housing member 62 is accelerated substantially along the axis of the bore 63, such as indicated by double headed arrow 82, piston 64 reciprocates within cylindrical bore 63 with respect to the housing 62, functioning as a pump to supply fluid from conduit channel 74 to discharge conduit 77 as indicated by the arrows. This embodiment also becomes a hydraulic accelerometer when used in conjunction with the conduit system of FIG. 1. However, when coupled with the conduit system of FIG. 2A, it becomes a velocity transducer.

While I have described my invention with respect to specific embodiments it will be apparent to those skilled in the art that many modifications and arrangements in the structure and elements of the illustrated apparatus may be made without departing from the spirit and scope of the present invention as defined by the appended claims.

I claim as my invention:

1. A control system in combination with a vibratory work-performing system comprising an oscillator operatively coupled to a work member, said control system comprising:
   prime mover means operatively coupled to drive said oscillator;
   acceleration responsive means operatively coupled to said work member to sense the acceleration of said work member to initiate a signal that is a function of the acceleration of said work member;
   force output control means including said prime mover means for controlling the force output amplitude of said oscillator; and
   signal transmission means operatively coupled to transmit said signal from said acceleration responsive means to said output control means.

2. The system of claim 1 wherein said acceleration responsive means is an inertially activated hydraulic pump.

3. The apparatus of claim 1 comprising elastic resonant transmission means operatively coupling said oscillator to said work member to form a resonant vibratory system.

4. A hydraulic vibration responsive means, said means comprising:
   a body member;
   a cylindrical bore formed in said body member;
   a free inertial mass piston reciprocably mounted in said bore and forming a chamber at each end thereof;
   a source of hydraulic fluid;
   intake conduit means communicating with said source and with said chambers for supplying fluid to said chambers;
   exhaust conduit means communicating with said chambers for transmitting fluid therefrom; and
   valve means for controlling the flow of fluid to and from said chambers.

5. The apparatus of claim 4 comprising fluid flow sensing means communicating with said exhaust conduit means.

6. The apparatus of claim 4 comprising restriction means in said exhaust conduit means; and
   pressure sensing means communicating with said exhaust conduit means.

References Cited
UNITED STATES PATENTS

Re. 18,518    7/1932    Braselton et al.
1,774,415    8/1930    Braselton et al.

EDGAR W. GEOGHEGAN, Primary Examiner

U.S. Cl. X.R.
60—51, 105; 417—525